(12) United States Patent
Hauner et al.

(10) Patent No.: US 12,337,507 B2
(45) Date of Patent: Jun. 24, 2025

(54) METHOD AND SYSTEM FOR MANAGING PRODUCTION OF MOLDED POLYURETHANE PRODUCTS

(71) Applicant: RIM Polymers Industries PTE Ltd, Singapore (SG)

(72) Inventors: Guido Hauner, Singapore (SG); Su Poo Ko, Singapore (SG)

(73) Assignee: RIM Polymers Industries PTE Ltd, Singapore (SG)

( * ) Notice: Subject to any disclaimer, the term of this patent is extended or adjusted under 35 U.S.C. 154(b) by 204 days.

(21) Appl. No.: 17/773,063

(22) PCT Filed: Nov. 11, 2019

(86) PCT No.: PCT/SG2019/050552
§ 371 (c)(1),
(2) Date: Apr. 29, 2022

(87) PCT Pub. No.: WO2021/096419
PCT Pub. Date: May 20, 2021

(65) Prior Publication Data
US 2024/0083074 A1 Mar. 14, 2024

(51) Int. Cl.
*B29C 31/00* (2006.01)
*B29K 75/00* (2006.01)
*G05B 19/418* (2006.01)

(52) U.S. Cl.
CPC ...... *B29C 31/006* (2013.01); *G05B 19/41895* (2013.01); *B29K 2075/00* (2013.01)

(58) Field of Classification Search
CPC ... B29C 31/085; B29C 31/065; B29C 31/061; B29C 31/047; B29C 31/044; B29C 31/041; B29C 31/04; B29C 31/008; B29C 31/004; B29C 31/006
See application file for complete search history.

(56) References Cited

U.S. PATENT DOCUMENTS

| | | | |
|---|---|---|---|
| 4,737,091 A * | 4/1988 | Fiorentini | B23Q 7/1442 249/161 |
| 6,438,780 B1 | 8/2002 | Hansen et al. | |
| 8,535,582 B2 | 9/2013 | Polk et al. | |
| 2009/0171497 A1 | 7/2009 | Sacchi et al. | |

FOREIGN PATENT DOCUMENTS

| | | |
|---|---|---|
| DE | 10-2011001516 A1 | 1/2012 |
| JP | H-11-292497 A | 10/1999 |

OTHER PUBLICATIONS

International Search Report and Written Opinion for PCT/SG2019/050552 dated Jan. 23, 2020, 7 pages.

* cited by examiner

*Primary Examiner* — Stella K Yi
(74) *Attorney, Agent, or Firm* — BLANK ROME LLP

(57) ABSTRACT

The disclosure relates to method and system for managing production of molded polymer or polyurethane products. In the various embodiments, a plurality of autonomous mobile platforms (AMPs) are interchangeably engageable with mold-carrying trolleys to provide self-propelled trolleys. Each self-propelled trolley is advanced through production station(s) and curing station to complete a production cycle. Between production cycles, the trolley may be diverted away for non-production task, e.g. mold replacement, without delaying subsequent or other trolleys. During curing, an AMP may be disengaged from a trolley and redeployed to other trolleys.

18 Claims, 5 Drawing Sheets

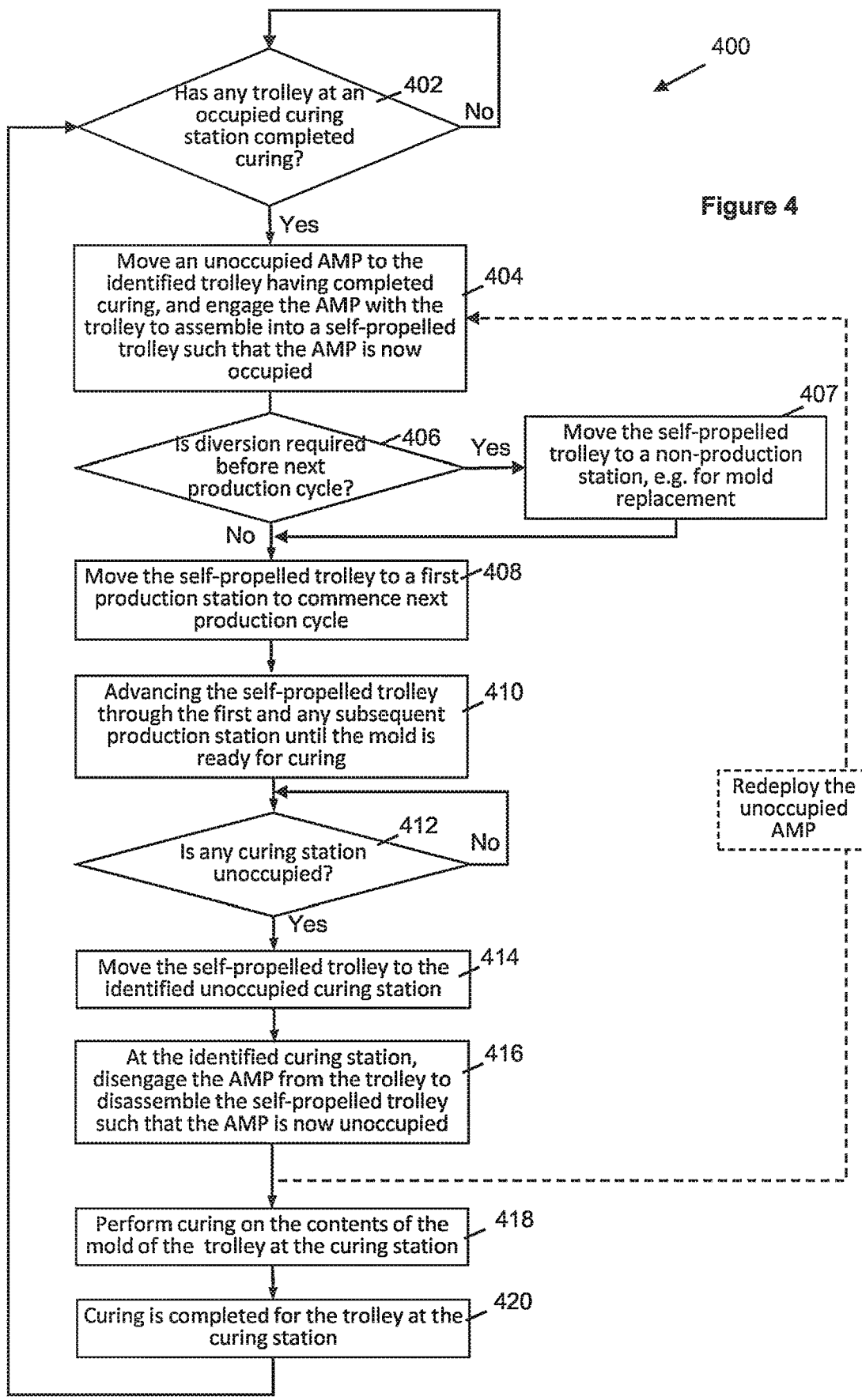

METHOD AND SYSTEM FOR MANAGING PRODUCTION OF MOLDED POLYURETHANE PRODUCTS

RELATED APPLICATIONS

This application is a national phase of PCT/SG2019/050552, filed on Nov. 11, 2019. The entire contents of this application is hereby incorporated by reference.

TECHNICAL FIELD

This disclosure generally relates to method and system for managing production of molded polymer products, such as but not limited to polyurethane ("PU") products produced by reaction injection molding process.

BACKGROUND

PU products such as engine covers and car seats are typically produced in manufacturing plants using reaction injection molding process. Existing manufacturing plant usually comprises a long fixed carousel system wherein molds are fixedly and respectively mounted on interconnected trolleys which are moved at constant speed around the carousel. This results in several inefficiencies including, but not limited to, a large manufacturing space is required to house the carousel system having fixed minimum length; high initial investment to set up a manufacturing plant with no assurance of volume order; lack of flexibility in replacing mold or switching to new mold thus resulting in disruption to production during mold replacement or switching; and lack of flexibility in scaling up production due to fixed carousel length.

Existing systems for production of molded articles include:

U.S. Pat. No. 8,535,582 B2 entitled "Method of Forming a Molded Article by Wireless Control", German Patent Application Publication No. DE102011001516 A1 entitled "Arrangement for Manufacturing Transport Pallets from Recycled Plastic, has Transportation Device for Automated Transport of Mold from Casting Station to Molding Station via Cooling Region, and for Return Back of Mold to Casting Station", and U.S. Pat. No. 6,438,780 B1 entitled "Assembly for Processing Blanks".

SUMMARY

According to one aspect of the disclosure, a method for managing production of molded polyurethane products is provided and comprises:
moving a first autonomous mobile platform (AMP) to a first trolley which has completed curing;
engaging the first AMP with the first trolley to assemble into a first self-propelled trolley, wherein the first trolley comprises a first mold carrier supporting a first mold;
moving the first self-propelled trolley to a first production station;
advancing the first self-propelled trolley through at least the first production station;
moving the first self-propelled trolley to a vacant first curing station;
disengaging the first AMP from the first trolley to disassemble the first self-propelled trolley; and
subjecting contents of the first mold to curing.

In some embodiments of the first aspect, after disengaging the first AMP from the first trolley to disassemble the first self-propelled trolley, the method further comprises:
moving the first AMP to a second trolley which has completed curing;
engaging the first AMP with the second trolley to assemble into a second self-propelled trolley, wherein the second trolley comprises a second mold carrier supporting a second mold;
moving the second self-propelled trolley to the first production station;
advancing the second self-propelled trolley through at least the first production station;
moving the second self-propelled trolley to a vacant curing station being the first or a second curing station;
disengaging the first AMP from the second trolley to disassemble the second self-propelled trolley; and
subjecting contents of the second mold to curing.

In some embodiments of the first aspect, before moving the first self-propelled trolley to the first production station, the method further comprises:
moving the first self-propelled trolley to a non-production station; and
at the non-production station, performing replacement of the first mold, or replacement of the first mold carrier together with the first mold, or maintenance of the first mold.

In some embodiments of the first aspect, the method further comprises:
moving a second AMP to a third trolley which has completed curing;
engaging the second AMP with the third trolley to assemble into a third self-propelled trolley, wherein the third trolley comprises a third mold carrier supporting a third mold;
while moving the first self-propelled trolley to the non-production station or while performing replacement of the first mold, or replacement of the first mold carrier together with the first mold, or maintenance of the first mold, moving the third self-propelled trolley to the first production station, and advancing the third self-propelled trolley through at least the first production station; and
moving the third self-propelled trolley to a vacant curing station being the first, the second, or a third curing station;
disengaging the second AMP from the third trolley to disassemble the third self-propelled trolley; and
subjecting contents of the third mold to curing.

According to a second aspect of the disclosure, a system for managing production of molded polyurethane products is provided and comprises:
a plurality of trolleys wherein each trolley comprises a mold carrier supporting a mold;
a plurality of AMPs which are configured to move and at least among a plurality of curing stations including a first curing station and a plurality of non-curing stations including a first production station, and further configured to interchangeably engage with any of the trolleys; and
a control system configured to communicably couple with the trolleys and with the AMPs and further configured to generate control signals and transmit the control signals to the AMPs to:
move a first autonomous mobile platform (AMP) to a first trolley which has completed curing;

engage the first AMP with the first trolley to assemble into a first self-propelled trolley;
move the first self-propelled trolley to a first production station;
advance the first self-propelled trolley through at least the first production station;
move the first self-propelled trolley to the first curing station which is vacant; and
disengage the first AMP from the first trolley to disassemble the first self-propelled trolley,
wherein the first curing station is configured to:
subject contents of the mold of the first trolley to curing.

In some embodiments of the second aspect, the curing stations include a second curing station, the trolleys include a second trolley, and wherein after the first AMP is disengaged from the first trolley to disassemble the first self-propelled trolley, the control system is further configured to:
move the first AMP to the second trolley which has completed curing;
engage the first AMP with the second trolley to assemble into a second self-propelled trolley;
move the second self-propelled trolley to the first production station;
advance the second self-propelled trolley through at least the first production station;
move the second self-propelled trolley to a vacant one of the curing stations being the first or the second curing station; and
disengage the first AMP from the second trolley to disassemble the second self-propelled trolley,
wherein the identified one of the curing stations being the first or the second curing station is configured to:
subject contents of the mold of the second trolley to curing.

In some embodiments of the second aspect, the non-curing stations include a non-production station, and wherein before the first self-propelled trolley is moved to the first production station, the control system is further configured to:
move the first self-propelled trolley to the non-production station; and
wherein the non-production station is configured to:
perform, on the first self-propelled trolley, replacement of the mold, or replacement of the mold carrier together with the mold, or maintenance of the mold.

In some embodiments of the second aspect, the curing stations include a third curing station, the AMPs include a second AMP, the trolleys include a third trolley, and wherein the control system is further configured to:
move the second AMP to the third trolley which has completed curing;
engage the second AMP with the third trolley to assemble into a third self-propelled trolley;
while the first self-propelled trolley is moved to the non-production station or while replacement of the mold, or replacement of the mold carrier together with the mold, or maintenance of the mold is performed, move the third self-propelled trolley to the first production station, and advance the third self-propelled trolley through at least the first production station;
move the third self-propelled trolley to a vacant one of the curing stations being the first, the second, or the third curing station; and
disengage the second AMP from the third trolley to disassemble the third self-propelled trolley,
wherein the identified one of the curing stations being the first, the second, or the third curing station is configured to:
subject contents of the mold of the third trolley to curing.

BRIEF DESCRIPTION OF DRAWINGS

FIG. 4 shows a flow chart describing a method for managing production of molded polyurethane products according to some embodiments.

DETAILED DESCRIPTION

Figure 1A:
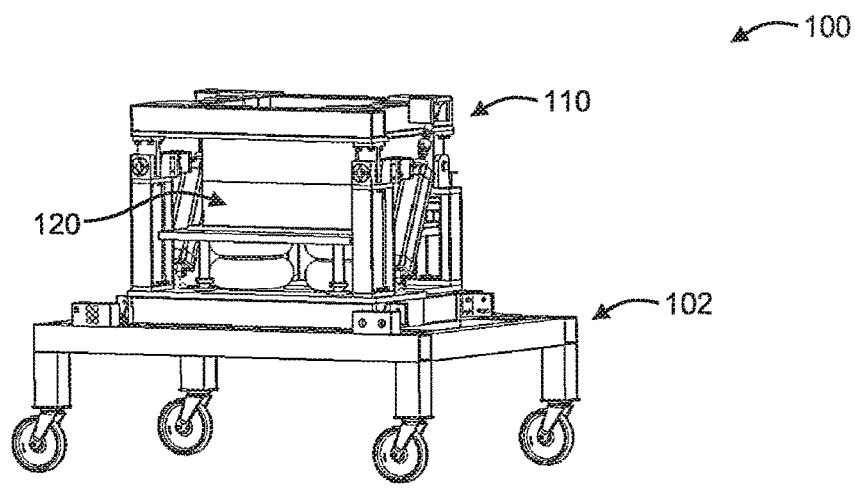
FIG. 1A shows a trolley according to some embodiments.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

Throughout this specification, including claims, the articles "a", "an" and "the" as used with regard to a feature or element include a reference to one or more of the features or elements. Throughout this specification, including claims, the terms "comprise", "comprises", "comprised", "comprising", "include", "includes", "including" or "having" are to be interpreted as specifying the presence of the stated features, integers, steps or components, but not precluding the presence of one or more other features, integers, steps or components. Identifiers such as "first", "second" and "third" are used merely as labels, and are not intended to impose numerical requirements on their objects, nor construed in a manner imposing any relative position or time sequence between limitations, or total count of their objects. The term "and/or" includes any and all combinations of one or more of the associated listed items. Yet furthermore, the term "coupled" and related terms are used in an operational sense and are not necessarily limited to a direct physical connection or coupling. Thus, for example, two devices may be coupled directly, or via one or more intermediary devices. In certain examples, devices may be suitably coupled such that information or signal can be passed there between, while not sharing any physical connection with each other. For example, two devices may be communicably coupled via a wired or wireless connection. Based on the present disclosure, a person of ordinary skill in the art will appreciate a variety of ways in which coupling exists in accordance with the aforementioned definition. The term "mold" include references to "mould" and related terms apply accordingly.

According to one aspect of the disclosure, as described with reference to FIGS. 1A, 1B, 1C, 2A, 2B, 2C, at least one system for managing production of molded polymer or polyurethane products is provided. The system generally comprises: a plurality of trolleys 100; a plurality of autonomous mobile platforms (AMPs) 200; and a control system configured to communicate with the trolleys 100 and the AMPs 200 and further configured to generate control signals and transmit the control signals to the AMPs 200. In particular, AMPs 200 are interchangeably engaged with mold-carrying trolleys 100 to transport the trolleys 100 from one station to another station to complete a production cycle and/or divert the trolleys 100 prior to a subsequent production cycle. The system may further comprise a plurality of stations, including curing stations 32 and non-curing stations.

Figure 1B:
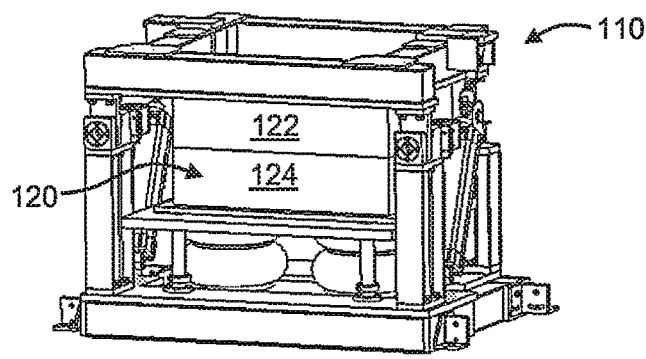
FIG. 1B shows a mold carrier supporting a mold.
Figure 1C:
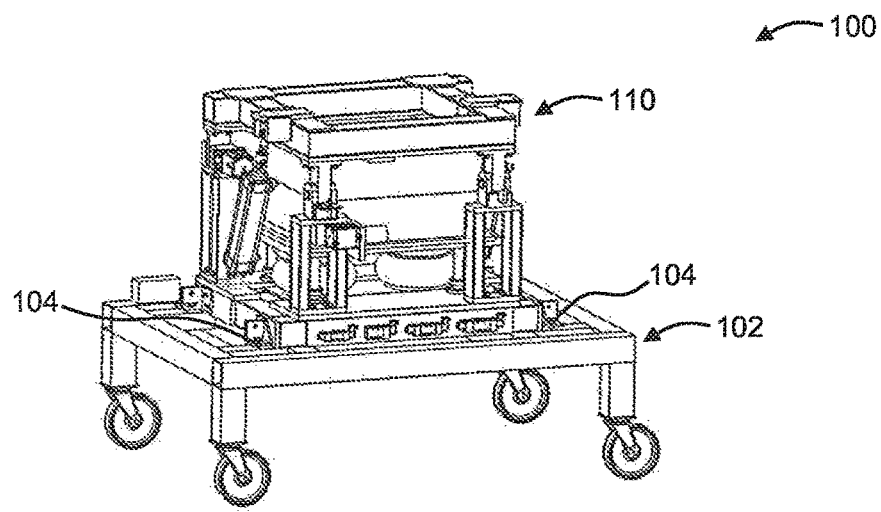
FIG. 1C shows a trolley provided with mounting points to allow connection of the mold carrier to the movable frame of the trolley.

The trolleys 100 are installed with mold carriers 110 and molds 120, and are transportable among the stations as required. FIG. 1A shows a trolley 100 according to some embodiments. The trolley 100 includes a movable frame 102, e.g. frame supported by wheels, which is actuatable, such as by a driving vehicle. The trolley 100 further includes a mold carrier 110 which is supported by the movable frame 102 and a mold 120 which is supported by the mold carrier 110. FIG. 1B shows a mold carrier 110 supporting a mold 120 which may comprise an upper mold 122 and a lower mold 124. The mold 120 may be movable between an open and a closed position. In the open position, a finished product is removable from the mold 120; in the closed position, the mold 120 is configured to facilitate curing of a liquid polyurethane or liquid foam contained therein. Liquid polyurethane or liquid foam may be poured into the mold 120 in the open or closed position. It is to be appreciated that other actions or steps not described herein may be performed to the mold 120 in the open or closed position. The mold 120 may be releasably mounted to the mold carrier 110, such as by one or more screws, bolts or other connection mechanism; similarly, the mold carrier 110 may be releasably mounted to the movable frame 102, such as by one or more screws, bolts or other connection mechanism. Accordingly, mold replacement or switching may be performed by interchanging an existing mold with a replacement mold for same or different product without removing the mold carrier 110 from the movable frame 102; or by interchanging an existing mold carrier, together with the mold, with a replacement mold carrier together with a replacement mold. FIG. 1C shows a trolley 100 provided with mounting points 104, e.g. flanges and openings, to allow releasable mounting or connection of the mold carrier 110 to the movable frame 102. It is to be appreciated that in some other embodiments, the mold carrier may be fixedly connected to, e.g. integrally formed with, the movable frame while the mold may be releasably mounted to the mold carrier.

The autonomous mobile platforms (AMPs) 200, e.g. unmanned ground vehicles and mobile robots, are configured to navigate or move in omni-directions at least among the stations. Travel routes of AMPs among the stations may not be fixed and may be determined by the control system during operation. In certain embodiments, magnetic stripes may be provided on the ground to define possible routes and guide AMPs, in particular their magnetic wheels, as they move along the route determined by the control system, while in certain other embodiments, magnetic stripes or other fixed tracks or rails may not be provided.

Figure 2A:
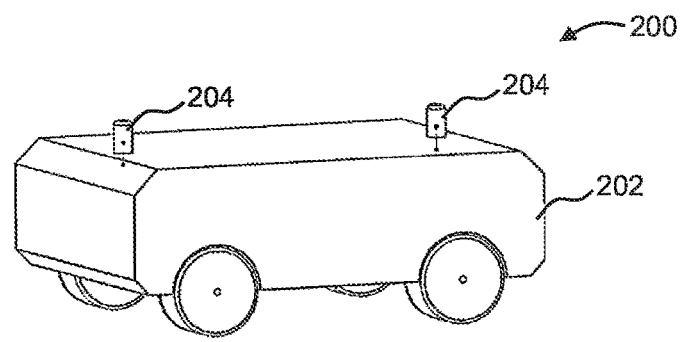
FIG. 2A shows an AMP in a disengaged position.
Figure 2B:
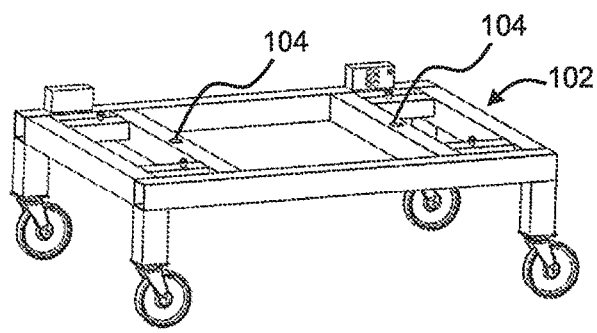
FIG. 2B shows a trolley in a disengaged position and having complementary openings or sockets for receiving the pistons of an AMP.
Figure 2C:
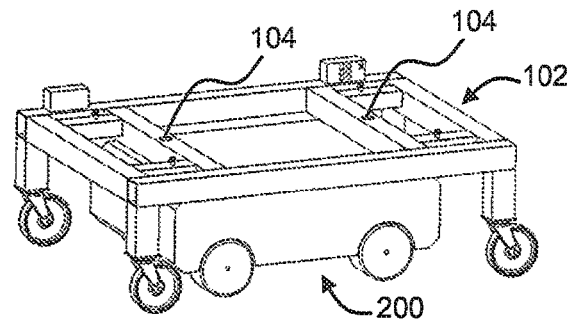
FIG. 2C shows both the AMP and the trolley (without mold and mold carrier) in an engaged position.
Figure 2D:
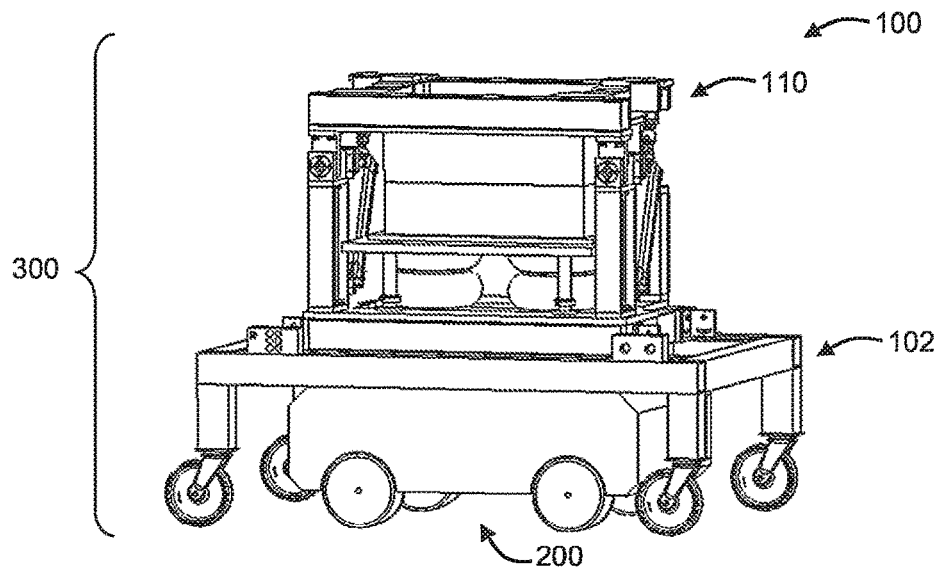
FIG. 2D shows both the AMP and the trolley (with mold and mold carrier) in an engaged position.

The AMPs 200 are interchangeably engageable with the trolleys 100 and are further configured to transport the trolleys 100 together with mold carriers 110 and molds 120. FIG. 2A shows an AMP 200 which comprises an AMP body 202, wheels rotatably coupled to the AMP body 202, movable pistons 204 provided on the AMP body 202, and one or more motors (not shown) housed in the AMP body 202. The pistons 204 may be operated by one or more electric, pneumatic or hydraulic actuator. FIG. 2B shows a trolley 100 having complementary openings 104 or sockets for receiving the pistons 204 of an AMP. FIGS. 2A and 2B respectively show the AMP 200 and the trolley 100 in a disengaged position wherein they are uncoupled and separately actuatable or transportable. To achieve an engaged position, the AMP 200 is appropriately positioned, e.g. at or under the trolley 100, thereafter the pistons 204 are pushed into and engaged with the complementary openings 104 or sockets. FIG. 2C shows both the AMP 200 and the trolley 100 in an engaged position (mold carrier and mold are not shown). In the engaged position, the AMP 200 and the coupled trolley 100 are temporarily assembled such that moving or driving the AMP 200 moves or transports the trolley 100 simultaneously. An assembled combination of the AMP 200 and coupled trolley 100, in the engaged position, may alternatively be referred to as a self-propelled trolley 300 (see FIG. 2D). To disassemble the self-propelled trolley 300, the pistons 204 are withdrawn from the complementary openings 104 or sockets such that the AMP 200 is disengaged from the trolley 100, i.e. in a disengaged position. In the disengaged position, an AMP 200 may be considered unoccupied; in the engaged position, an AMP 200 may be considered occupied. It is to be appreciated that an AMP 200 may be engaged with and disengaged from a trolley 100 using other mechanisms, e.g. fastener, bolt and socket combination, magnetic lock.

The control system is configured to manage deployment of the AMPs and trolleys according to production plan. It may also manage other aspects of production, e.g. processes at each station, data collection, utilities required at each station, etc. The control system is communicably coupled to the trolleys, AMPs, stations, etc, and configured to generate signals and transmit the signals thereto and receive signals therefrom. The control system comprises at least one computer processor communicably coupled with at least one memory storage which stores computer-executable instructions for execution by the processor(s), and transmission and receiving units for transmitting signals, e.g. control signals, to AMPs, trolleys and/or stations and receiving signals, e.g. data signals, from AMPs, trolleys and/or stations.

The stations or working stations, including curing stations 32 and non-curing stations, provide various production and/or maintenance steps to be performed for production of molded PU products.

Non-curing stations may include production stations and non-production stations. Production stations, in the present disclosure, generally include working stations wherein molds are treated and raw materials are processed in pre-defined sequence prior to curing. Production stations 34 may include (i) mold opening and finished product removal station 34a, (ii) mold cleaning station 34b, (iii) auxiliary material insertion and/or inlay insertion station 34c (optional), (iv) liquid polyurethane or foam material dispensing and mold closing station 34d. At least some of the production stations may provide utilities, e.g. compressed air, hydraulics and/or electricity, to facilitate production steps. Non-production stations generally include working stations wherein molds, mold carriers, trolleys and/or AMPs are replaced and/or maintained on an ad-hoc basis, e.g. after a predetermined number of production cycles. Non-production stations 36 may include mold replacement or maintenance stations. The non-curing stations may be manned, e.g. operated by a human with or without intervention of machine(s), or unmanned, e.g. operated by a machine without human intervention. It is to be appreciated that references to non-curing stations include references to their operator whether human or machine. Processing steps to be performed at each non-curing station will be described in later paragraphs.

Curing stations 32 allow contents of the mold, e.g. liquid polyurethane or liquid foam material, to be subject to curing according to required curing time. The curing stations 32 may provide heating units and utilities, e.g. compressed air, hydraulics and/or electricity, to facilitate curing. Heating units may be operated by a heated water supply which may be heated by solar energy, or operated by electricity or electrical induction. The curing stations 32 may be manned, e.g. operated by a human with or without intervention of machine(s), or unmanned, e.g. operated by a machine without human intervention. It is to be appreciated that references to curing stations include references to their operator whether human or machine. A curing station 32 may be considered unoccupied or vacant when no trolley is positioned there or when no curing process is being performed. Conversely, a curing station 32 may be considered occupied when a trolley is positioned there or when a curing process is taking place.

A production cycle for a mold and/or mold carrier includes advancement through certain production stations in a predefined sequence, and subsequently through a curing station. This cycle is generally iterated until a non-production task is ascertained necessary in which case the next production cycle is paused in order for performance of the non-production task after which the next production cycle is resumed or begins.

Figure 3A:
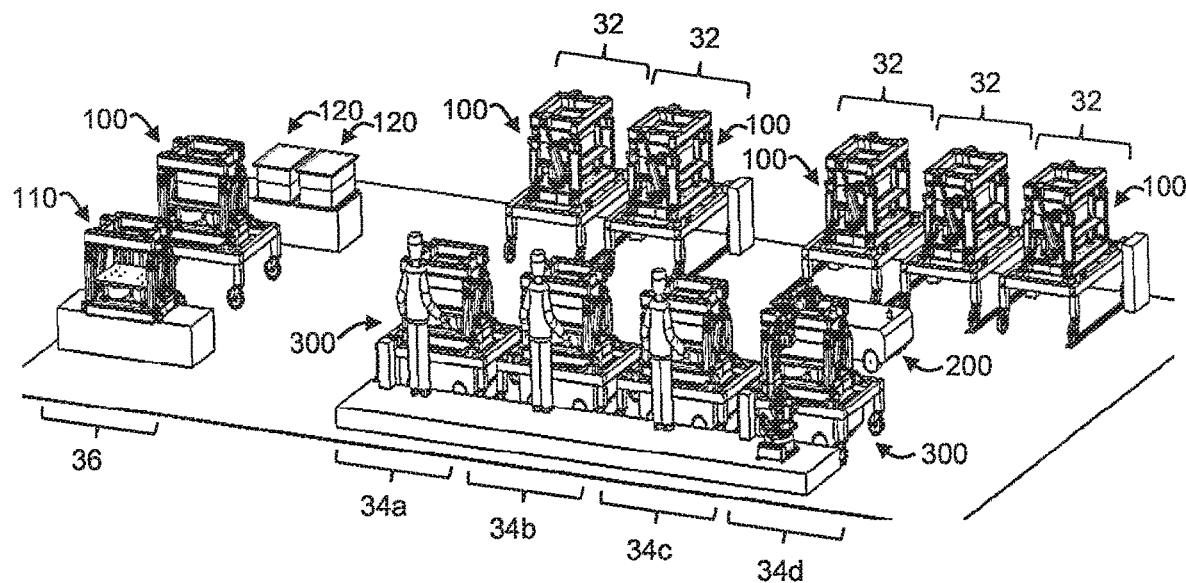
FIG. 3A is a schematic overview of a production floor layout according to some embodiments.
Figure 3B:
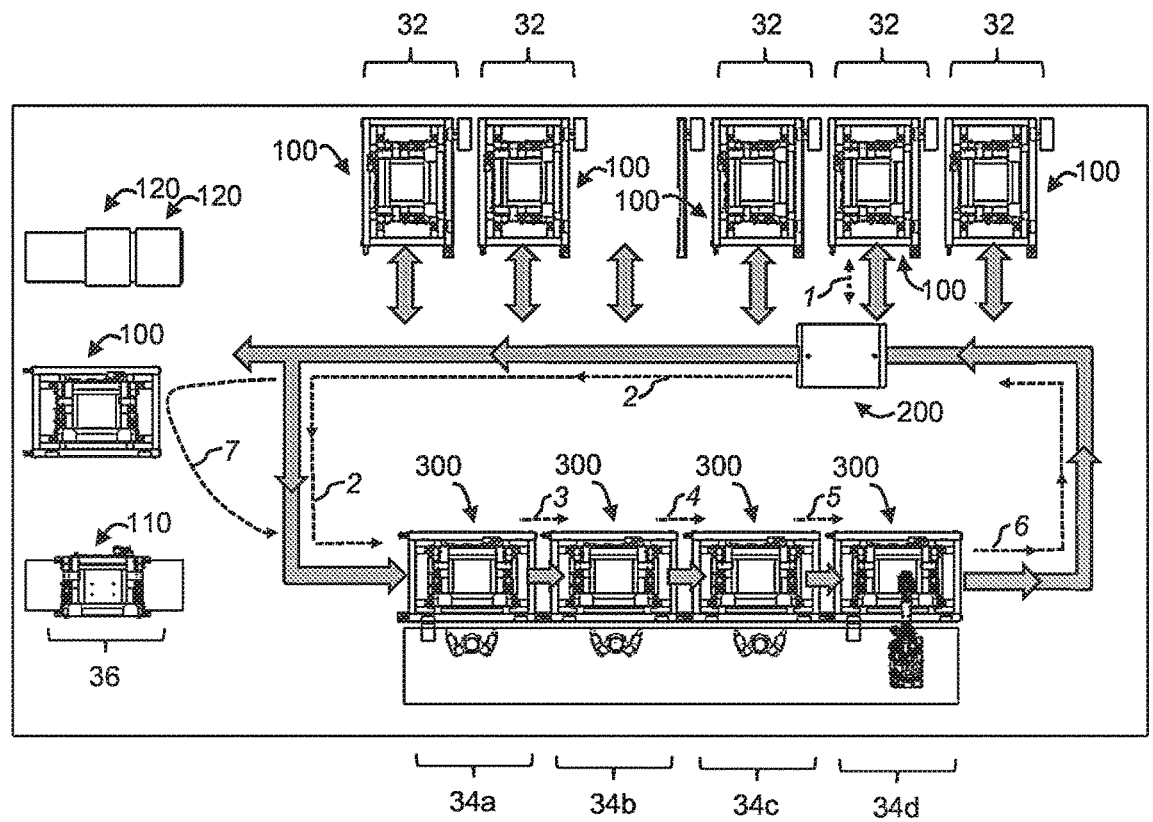
FIG. 3B is a plan view of FIG. 3A and shows a production management route taken by an AMP which is movable among curing stations and non-curing stations.

FIG. 3A is a schematic overview of a production floor layout according to some embodiments. The layout includes a plurality of production stations 34a, 34b, 34c, 34d which are configured to perform sequential process steps on a mold, a plurality of curing stations 32 which are configured to perform curing on contents of the mold after transfer of the mold from the four production stations 34a, 34b, 34c, 34d, and at least one mold changing station 36 which is configured to perform mold changing or maintenance. It is to be appreciated that, in some other embodiments, the number of production stations may be more than four or less than four depending on the product and necessary production steps. FIG. 3B is a plan view of FIG. 3A and shows possible production management routes (see block arrows) of an AMP 200 among curing stations 32 and non-curing stations. In FIG. 3B, the AMP is directed towards one of the curing stations 32 (see dash arrow 1). The AMP 200 approaches a trolley 100 at the identified curing station 32 and engages with the trolley 100. The AMP 200 transports the trolley 100 to circulate through a first, a second, a third and/or a fourth production station 34a, 34b, 34c, 34d (see dash arrow 2). At each of these stations, the AMP 200 pauses the trolley 100 for a corresponding predetermined time period or until it receives directions to move to the next station (see dash arrows 3, 4, 5). After the AMP 200 advances the trolley 100 through the production stations 34a, 34b, 34c, 34d, the AMP 200 transports the trolley 100 to a vacant curing station to perform curing (see dash arrow 6). In the above-described route, before the AMP 200 transports the trolley 100 from a curing station to circulate through the first, the second, the third and/or the fourth production station 34a, 34b, 34c, 34d, the AMP 200 may, if necessary, divert the trolley 100 to a non-production station 36 to perform mold replacement or maintenance or other non-production steps, before directing the trolley to the first production station 34a (i.e. dash arrow 2 diverts to dash arrow 7 and thereafter reverts to route of dash arrow 2).

According to one aspect of the disclosure, at least one method for managing production of molded polymer or polyurethane products is provided and described with reference to a flow chart FIG. 4 according to some embodiments.

In block 402, the method comprises ascertaining whether any trolley positioned at an occupied curing station has completed curing. This may be performed by a control system which may receive signals from curing stations regarding status of curing process at each curing station.

In block 404, if one of the trolleys which may be positioned at an occupied curing stations and identified as having completed curing, the method comprises directing an unoccupied AMP to move to the identified curing station and engage with the identified trolley to assemble into a self-propelled trolley. This may be performed by the control system which may transmit signals with instructions to the AMP. Particularly, the AMP is moved to the identified trolley positioned at the curing station, appropriately positioned at/under the trolley and engaged with the trolley by activating the AMP's pistons and pushing the pistons into complementary openings of the trolley. Once engaged, the AMP and the trolley, are assembled into a self-propelled trolley. The AMP is now occupied.

In block 406, the method comprises ascertaining whether a diversion of the self-propelled trolley is required before next production cycle. In particular, the method may ascertain whether a non-production step, e.g. mold replacement or maintenance is required of the self-propelled trolley. This may be performed by the control system based on data, e.g. mold condition, production cycle count. If diversion, e.g. mold replacement or maintenance, is not required, block 406 proceeds to block 408.

In block 408, the self-propelled trolley is moved from the curing station to a first production station to commence a next production cycle. This may be performed by the control system which may transmit signals with instructions to the AMP.

In block 410, the self-propelled trolley is advanced through the first and any subsequent production station, as described in the paragraphs below.

The self-propelled trolley is moved to the first production station, e.g. finished product removal station. More particularly, the self-propelled trolley is appropriately positioned at this station; the self-propelled trolley is connected to utilities if necessary; the mold carrier and/or mold is opened; the finished product is removed from the mold; the self-propelled trolley is disconnected from utilities if necessary.

Thereafter, the self-propelled trolley is advanced or moved to a second production station, e.g. a mold cleaning station. More particularly, the self-propelled trolley is appropriately positioned at this station; the mold which is now devoid of a finished product is treated, e.g. cleaned, in preparation for mold injection.

Thereafter, the self-propelled trolley is advanced or moved to a third production station, e.g. an auxiliary material and/or inlay insertion station. More particularly, the self-propelled trolley is appropriately positioned at this station; a mold release is dispensed into the treated mold if necessary; an inlay is arranged in the treated mold if necessary. This station or step is optional and therefore is not required if the production cycle does not require an auxiliary material or an inlay.

Thereafter, the self-propelled trolley is advanced or moved to a fourth production station, e.g. a liquid polyurethane or foam dispensing station. More particularly, the self-propelled trolley is appropriately positioned at this station; the self-propelled trolley is connected to utilities if necessary; the mold carrier and/or mold is closed; a liquid polyurethane or liquid foam is transferred into the mold by moving a mixing head of a dispensing robot to an injection opening of the mold, injecting a liquid polyurethane or liquid foam through the mixing head and the injection opening into the mold, and removing the mixing head from the injection opening; thereafter the self-propelled trolley is disconnected from utilities if necessary. The mold in the self-propelled trolley is now ready for curing. Although the above describes closed mold pouring, it is to be appreciated that, in some embodiments, open mold pouring may be performed. More particularly, after the self-propelled trolley is appropriately positioned at the liquid polyurethane or foam dispensing station and the self-propelled trolley is connected to utilities if necessary, the mold carrier and/or mold is opened or remains open from the previous station; a liquid polyurethane or liquid foam is transferred into the open mold by moving a mixing head of a dispensing robot to position over the open mold, injecting a liquid polyurethane or liquid foam through the mixing head and the injection opening into the mold, and removing the mixing head from the opened mold; the mold is actuated to be closed; thereafter the self-propelled trolley is disconnected from utilities if necessary.

In block 410, moving the self-propelled trolley to the first, the second, the third and/or the fourth production station at each production station may be directed by the control system which may transmit signals with instructions to the AMP. Pausing the trolley at each production station may be directed by the control system which may receive signals from sensors at the corresponding station, ascertain whether the trolley has completed processing at each of the corresponding production station based on such sensor signals, and thereby generate signals with instruction to the AMP to continue pausing at the station or move to the next station. Also in block 410, connection of the trolley to utilities and performing production steps, e.g. removing finished product, cleaning mold, inserting inlay, transferring liquid polyurethane or liquid foam into the mold, may be performed by the corresponding production station, or operator thereof, at which the trolley is positioned. Throughout the first to the fourth production stations, the AMP may remain engaged with the trolley.

In block 412, the method comprises ascertaining whether any curing station is unoccupied. This may be performed by the control system which may receive signals from curing stations regarding status of occupancy at each curing station.

In block 414, if one of the curing stations is ascertained unoccupied, the self-propelled trolley is directed to the identified curing station. More particularly, the self-propelled trolley is moved to the unoccupied curing station and appropriately positioned. This may be performed by the control system which may transmit signals with instructions to the AMP. Furthermore, the trolley may be connected to a heating unit and/or utilities.

In block 416, after the self-propelled trolley is appropriately positioned at the curing station, the AMP is disconnected from the trolley to disassemble the self-propelled trolley such that the AMP is now unoccupied. This may be performed by the control system which may transmit signals with instructions to the AMP.

In block 418, contents of the mold of the trolley at the curing station are subject to curing in which heat is supplied to the mold contents such that a chemical reaction takes place to result in hardening and/or stabilising of the mold contents. This may be performed by the corresponding curing station. Curing conditions, e.g. temperatures, pressure, curing times, may be controlled by the control system.

Prior to performing curing, e.g. before or after the AMP is disconnected from the trolley, the trolley may be connected to a heating unit in block 414 or 416. After performing curing, e.g. the trolley may be disconnected from the heating unit. This may be performed by the corresponding curing station.

In block 420, curing is completed for the trolley at the curing station. After completion of curing, the method returns to block 402 for the trolley to repeat the flow sequence containing blocks 402 to 420. In the repeat flow sequence, a different AMP or the same AMP which advanced the trolley through blocks 406 to 416 in the previous cycle, may be directed to engage with the trolley, depending on the available AMPs at the time of commencing the repeat flow sequence.

It is to be appreciated that after block 416, after the AMP is disengaged from the trolley at the curing station, the unoccupied AMP may now be redeployed to an other trolley which has completed curing. This may be performed by the control system which may determine a need for the AMP by another trolley and thereby transmit signals with instructions to the AMP.

In the foregoing description, block 406 directly proceeds to block 408 as diversion is ascertained as not required. However, if it is ascertained in block 406 that diversion is required, block 406 proceeds to block 407 wherein the self-propelled trolley is moved to a non-production station for mold replacement, e.g. if the existing mold is not fit for use or if a different mold design is required to produce a different PU product, or for maintenance of the mold or other parts of the trolley, or for other purpose. While the self-propelled trolley is diverted prior to its next production cycle, other self-propelled trolleys which have completed curing subsequently may proceed from block 404 to block 406 to block 408, i.e. bypass the diverted trolley to commence with their next production cycles without being affected or delayed by the diversion.

Figure 5A:
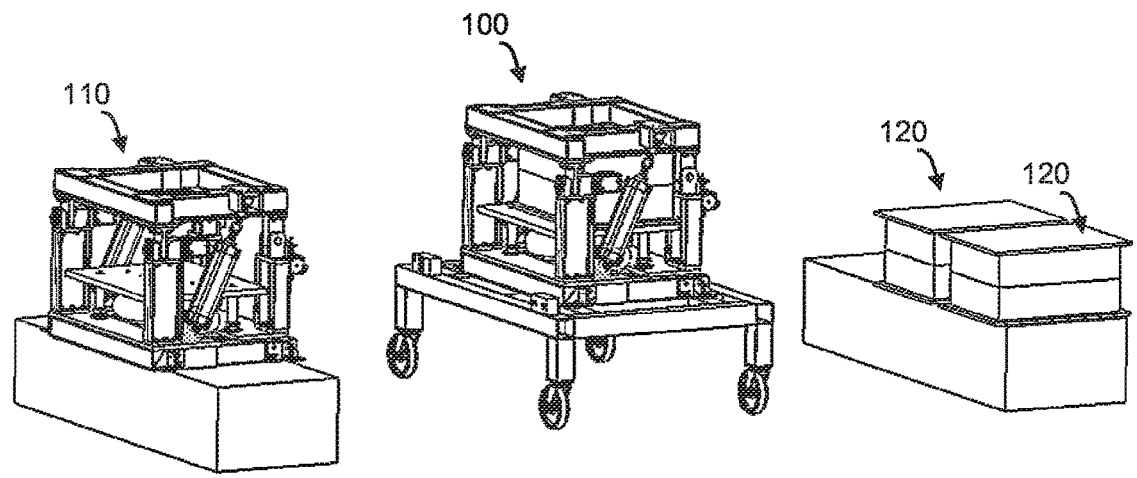
FIG. 5A shows a mold replacement station.

If the self-propelled trolley is diverted to the non-production station for mold replacement (see FIG. 5A), the mold carrier and/or mold may be unloaded from the self-propelled trolley; a replacement mold carrier and/or mold may be installed; and the finished product may be removed from the unloaded mold carrier and/or mold. This may be performed by the corresponding non-production station. The self-propelled trolley, together with its replacement mold carrier and mold, is moved, in block 408, to a production station for a next production cycle through block 410 to block 420. This may be performed by the control system which transmit signals with instructions to the AMP.

If the self-propelled trolley is diverted to the non-production station for maintenance, the mold carrier and/or mold may be unloaded from the self-propelled trolley; the finished product may be removed from the unloaded mold carrier and/or mold. This may be performed by the corresponding non-production station. Thereafter, the self-propelled trolley may be moved to elsewhere for maintenance. This may be performed by the control system which transmit signals with instructions to the AMP.

An illustrative example of the method 400 of FIG. 4 is described as follows with reference to FIG. 3B which shows a schematic route of AMP. In a first cycle of method 400, a first trolley is ascertained as having completed curing at an occupied curing station (block 402, first cycle). A first AMP is moved to the first trolley and engaged therewith to assemble into a first self-propelled trolley (block 404, first cycle). If the first self-propelled trolley is ascertained as not requiring diversion (block 406, first cycle), the first self-propelled trolley is moved to a production station to commence a new production cycle (block 408, first cycle). The first self-propelled trolley is advanced through a first, a second, a third and/or a fourth production station until the mold of the first self-propelled trolley is ready for curing (block 410, first cycle). A curing station is ascertained as being vacant (block 412, first cycle). The first self-propelled trolley is moved to the identified vacant curing station (block 414, first cycle) where the first AMP is disengaged from the first trolley thereby disassembling the first self-propelled trolley (block 416, first cycle). The first AMP is now unoccupied and may be redeployed, e.g. move to a second trolley which has completed curing at another occupied curing station, engage therewith to assemble into a second self-propelled trolley, and advance the second self-propelled trolley through blocks 408 to 414 in a separate cycle of the method 400, i.e. separate from the aforementioned first cycle. On the other hand, continuing the aforementioned first cycle, the first trolley completes curing (block 418 and block 420, first cycle) which completes the first cycle of the method 400.

Thereafter, a second cycle of the method 400 commences in which the first trolley is ascertained as having completed curing at an occupied curing station (block 402, second cycle). An available AMP is moved to the first trolley and engaged therewith to assemble into a self-propelled trolley (block 404, second cycle). This available AMP may be the first AMP which was deployed in the first cycle or may be a second, third, or subsequent AMP which is available at that time. The second cycle of the method 400 continues accordingly, thereafter a third, a fourth and subsequent cycles of the method 400 are performed.

If the first self-propelled trolley is ascertained as requiring diversion (block 406, first cycle), the first self-propelled trolley is moved to a non-production station for mold replacement or maintenance (block 407, first cycle). After the necessary mold replacement or maintenance is performed, the first self-propelled trolley is ready to commence with the next production cycle and, accordingly, the first self-propelled trolley is moved to a production station for commencing next production cycle (block 408, first cycle). In the above diversion, after the first self-propelled trolley is moved away from the curing station or during diversion of the first self-propelled trolley (block 407, first cycle), other trolleys, e.g. a third trolley, at an occupied curing station may now have completed curing. A second AMP is moved to the third trolley and is engaged therewith to assemble into a third self-propelled trolley. The third self-propelled trolley is moved to the non-curing station for commencing a next production cycle. In other words, even though the third trolley or other trolleys may have completed curing later than the first trolley, the third trolley or other trolleys may bypass the first trolley in commencing with the next production cycle if the first trolley is diverted and do not have to wait from the first trolley commence the next production cycle before they are able to commence their next production cycle(s).

Figure 5B:
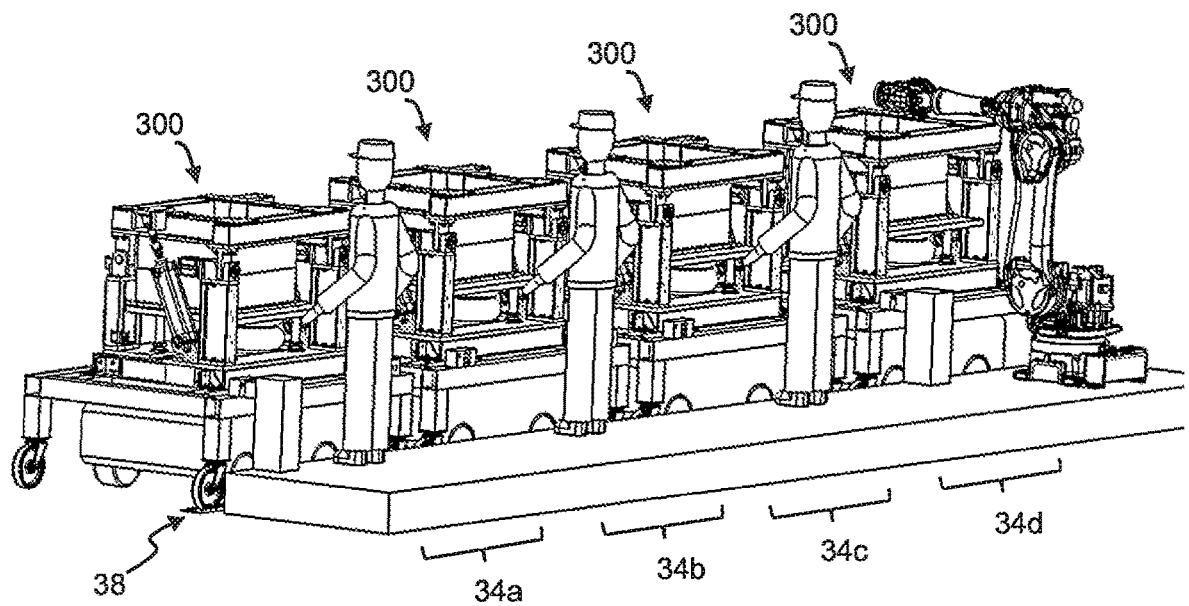
FIG. 5B shows a guide rail provided at production stations.

It is to be appreciated that in some of the foregoing embodiments, a guide rail 38 may be provided at the first, the second, the third and/or the fourth production stations (see FIG. 5B). The guide rail 38 may receive some, e.g. two, wheels of a trolley being advanced through the production stations to improve alignment of the trolley therewith. Accordingly, as a self-propelled trolley is moved through the production stations, i.e. when the AMP drives the trolley, one side of the trolley moves along the guide rail. In some other embodiments, guide rail is not provided at the production stations 34a, 34b, 34c, 34d, in which case sensors may be provided at the production stations to ascertain alignment of the trolley with respect to the relevant production station. The alignment information may be transmitted to the control system which ascertains whether the current alignment is acceptable and, if the current alignment is unacceptable, the control system transmits signals with instructions to the AMP of the self-propelled trolley to refine alignment.

It is to be appreciated that in some of the foregoing embodiments, the curing stations may be provided in a heating tunnel or enclosure. Within the heating tunnel or enclosure, one or more designated areas may be provided as curing stations. The designated areas may be discrete areas or continuous areas which may be adjacently arranged. An interior of the heating tunnel or enclosure may be provided at curing temperature, and hence a trolley positioned therein may not require connection to utilities, e.g. electricity, or to a heating unit to facilitate curing.

It is to be appreciated that in some other embodiments, each trolley or mold carrier may comprise a heating unit which is configured to provide heat to the contents of the mold. Accordingly, curing stations may be provided as one or more designated areas on the production floor or layout, where trolleys may be parked during curing. The heating unit of may be operated by an electrical source supported by the trolley or a battery of an AMP or by utilities, e.g. electricity, provided at the curing stations. The designated areas may be discrete areas or continuous areas which may be adjacently arranged.

Throughout the specification, including claims, notwithstanding the references to a first and a second AMP; a first, a second and a third trolley; a first, a second, a third and a fourth production station; a first, a second, a third curing station, it is to be appreciated that the above references are for ease of illustration and do not restrict the quantity of various components as such. In different embodiments, the number of AMPs may be two or more; the number of trolleys may be two, three or more; the number of production stations may be one or more; the number of curing stations may be two or more; the number of non-production stations may be one or more.

Embodiments of the disclosure provide advantages including but not limited to the following.

(i) Comparison is made against a fixed line carousel system where molds are moved at constant speed along the line:
   a. Embodiments of the disclosure require a smaller space to install unlike the fixed line carousel system which requires a fixed minimum length.
   b. Embodiments of the disclosure require lower initial investments to set up unlike the fixed line carousel system which requires higher initial investments due to its minimum length.
   c. Embodiments of the disclosure provide higher flexibility in scaling up production volume as curing stations and production stations may be added to the production floor without necessarily having to reconstruct production layout or disrupt existing stations. This is unlike the fixed line carousel system which does not allow scaling up due to its fixed length.
   d. In embodiments of the disclosure, switching molds does not disrupt production as the trolley requiring mold replacement or maintenance is diverted away, therefore minimising or eliminating waiting time. In the fixed line carousel system, switching mold disrupts production as the fixed line carousel system has to be stopped to allow mold replacement or maintenance.
   e. In embodiments of the disclosure, different curing times can be accommodated therefore minimising waiting time. This allows two or more product types to be produced within a production layout. In the fixed line carousel system, different curing times cannot be accommodated as the line operates at constant speed.

(ii) Interchangeable engagement or connection of AMPs with trolleys allows efficient deployment of AMPs. For example, when a self-propelled trolley is positioned at a curing station to commence curing, its AMP may be disengaged from the trolley and redeployed to another trolley.

(iii) Detachability of mold or mold carrier with mold from a trolley allows easier mold replacement and maintenance.

(iv) The ability to navigate the AMPs among stations without being limited to a fixed sequence or conveyor defined by a carousel and provision of a non-production station separate from production stations allows certain trolleys which require non-production tasks to be diverted from the production queue. This permits other trolleys to bypass the trolleys destined for non-production tasks and to proceed with next production cycle without having wait for completion of non-production tasks.

Other embodiments will be apparent to those skilled in the art from consideration of the specification and practice of the disclosure. Furthermore, certain terminology has been used for the purposes of descriptive clarity, and not to limit the disclosed embodiments. The embodiments and features described above should be considered exemplary.

The invention claimed is:

1. A method of managing production of molded polyurethane products: by moving a plurality of autonomous mobile platform (AMPs) at least among a plurality of curing stations and a plurality of non-curing stations, and interchangeably engaging the AMPs with any of a plurality of trolleys, the method comprising;
   moving a first (AMP) to a first trolley which has completed curing;
   engaging the first AMP with the first trolley to assemble into a first self-propelled trolley, wherein the first trolley comprises a first mold carrier supporting a first mold;
   moving the first self-propelled trolley to a first production station;
   advancing the first self-propelled trolley through at least the first production station;
   moving the first self-propelled trolley to a vacant first curing station;
   disengaging the first AMP from the first trolley to disassemble the first self-propelled trolley;
   subjecting contents of the first mold to curing;
   moving an available AMP to the first trolley upon curing the contents of the first mold; and
   engaging the available AMP with the first trolley to assemble into the first self-propelled trolley,
   wherein the AMPs include the first AMP and the available AMP which is different from the first AMP, wherein the curing stations include the first curing station, wherein the non-curing stations include the first production station, wherein the trolleys include the first trolley.

2. The method of claim 1, wherein after disengaging the first AMP from the first trolley to disassemble the first self-propelled trolley, the method further comprising:
   moving the first AMP to a second trolley which has completed curing;
   engaging the first AMP with the second trolley to assemble into a second self-propelled trolley, wherein the second trolley comprises a second mold carrier supporting a second mold;
   moving the second self-propelled trolley to the first production station;
   advancing the second self-propelled trolley through at least the first production station;
   moving the second self-propelled trolley to a vacant curing station being the first or a second curing station;
   disengaging the first AMP from the second trolley to disassemble the second self-propelled trolley; and
   subjecting contents of the second mold to curing;
   wherein the trolleys include the second trolley, wherein the curing stations include the second curing station.

3. The method of claim 1, wherein before moving the first self-propelled trolley to the first production station, the method further comprises:
   moving the first self-propelled trolley to a non-production station;
   at the non-production station, performing replacement of the first mold, or replacement of the first mold carrier together with the first mold, or maintenance of the first mold-;
   moving a second AMP to a third trolley which has completed curing later than the first trolley;
   engaging the second AMP with the third trolley to assemble into a third self-propelled trolley, wherein the third trolley comprises a third mold carrier supporting a third mold;
   while moving the first self-propelled trolley to the non-production station or while performing replacement of the first mold, or replacement of the first mold carrier together with the first mold, or maintenance of the first mold, moving the third self-propelled trolley to the first production station, and advancing the third self-propelled trolley through at least the first production station; and moving the third self-propelled trolley to a vacant curing station;

disengaging the second AMP from the third trolley to disassemble the third self-propelled trolley; and subjecting contents of the third mold to curing, wherein the AMPs include the second AMP, wherein the non-curing stations include the non-production station, wherein the trolleys include the third trolley.

4. The method of claim 1, wherein advancing the first self-propelled trolley through at least the first production station comprises:

removing, at the first production station, a finished product from the first mold;

treating, at a second production station, the first mold which is devoid of the finished product; and dispensing, at a fourth production station, a liquid polyurethane or liquid foam into the treated first mold.

5. The method of claim 4, wherein advancing the first self-propelled trolley through at least the first production station comprises:

before removing the finished product from the first mold, positioning at least some of a plurality of wheels of the first trolley in a guide rail;

before treating the first mold, moving the first self-propelled trolley to the second production station, including moving the first trolley along the guide rail; and before dispensing the liquid polyurethane or liquid foam into the treated first mold, moving the first self-propelled trolley to the fourth production station, including moving the first trolley along the guide rail.

6. The method of claim 4, wherein advancing the first self-propelled trolley through at least the first production station comprises:

before dispensing the liquid polyurethane or liquid foam into the treated first mold, inserting, at a third production station, an inlay or an auxiliary material into the treated first mold.

7. The method of claim 4, wherein advancing the first self-propelled trolley through at least the first production station comprises:

before removing the finished product from the first mold, connecting the first trolley to utilities at the first production station;

before treating the first mold, connecting the first trolley to utilities at the second production station; and before dispensing the liquid polyurethane or liquid foam into the treated first mold, connecting the first trolley to utilities at the fourth production station.

8. The method of claim 1, wherein after moving the first self-propelled trolley to the identified vacant curing station or after disengaging the first AMP from the first trolley to disassemble the first self-propelled trolley, connecting the first trolley to a heating unit.

9. The method of claim 1, wherein the curing stations are provided in a heating tunnel or enclosure, or a designated area on a production floor.

10. A system for of managing production of molded polyurethane products, the system comprising:

a plurality of trolleys wherein each trolley comprises a mold carrier supporting a mold;

a plurality of autonomous mobile platform AMPs which are configured to move least among a plurality of curing stations including a first curing station and a plurality of non-curing stations including a first production station, and further configured to interchangeably engage with any of the trolleys; and a control system configured to communicably couple with the trolleys and with the AMPS and further configured to generate control signals and transmit the control signals to the AMPs to:

move a first (AMP) to a first trolley which has completed curing;

engage the first AMP with the first trolley to assemble into a first self-propelled trolley;

move the first self-propelled trolley to a first production station;

advance the first self-propelled trolley through at least the first production station;

move the first self-propelled trolley to the first curing station which is vacant; and disengage the first AMP from the first trolley to disassemble the first self-propelled trolley, wherein the first curing station is configured to:

subject contents of the mold of the first trolley to curing;

wherein the control system is configured to:

move an available AMP to the first trolley upon curing the contents of the mold of the first trolley; and engage the available AMP with the first trolley to assemble into the first self-propelled trolley, wherein the AMPs include the first AMP and the available AMP which is different from the first AMP, wherein the trolleys include the first trolley.

11. The system of claim 10, wherein the curing stations include a second curing station, wherein the trolleys include a second trolley, and wherein after the first AMP is disengaged from the first trolley to disassemble the first self-propelled trolley, the control system is further configured to:

move the first AMP to the second trolley which has completed curing;

engage the first AMP with the second trolley to assemble into a second self-propelled trolley;

move the second self-propelled trolley to the first production station;

advance the second self-propelled trolley through at least the first production station;

move the second self-propelled trolley to a vacant one of the curing stations being the first or the second curing station; and disengage the first AMP from the second trolley to disassemble the second self-propelled trolley, wherein the identified one of the curing stations being the first or the second curing station is configured to:

subject contents of the mold of the second trolley to curing.

12. The system of claim 10, wherein the non-curing stations include a non-production station, wherein before the first self-propelled trolley is moved to the first production station, the control system is further configured to:

move the first self-propelled trolley to the non-production station;

wherein the non-production station is configured to:

perform, on the first self-propelled trolley, replacement of the mold, or replacement of the mold carrier together with the mold, or maintenance of the mold wherein the AMPs include a second AMP, wherein the trolleys include a third trolley, and wherein the control system is further configured to:

move the second AMP to the third trolley which has completed curing later than the first trolley;

engage the second AMP with the third trolley to assemble into a third self-propelled trolley;

while the first self-propelled trolley is moved to the non-production station or while replacement of the mold, or replacement of the mold carrier together with the mold, or maintenance of the mold is performed, move the third self-propelled trolley to the first production station, and advance the third self-propelled trolley through at least the first production station;

move the third self-propelled trolley to a vacant one of the curing stations; and disengage the second AMP from the third trolley to disassemble the third self-propelled trolley, wherein the identified one of the curing stations is configured to:

subject contents of the mold of the third trolley to curing.

13. The system of claim 10, wherein the non-curing stations include a second production station and a fourth production station, and wherein the first production station is configured to remove a finished product from the mold;

the second production station is configured to treat the mold which is devoid of the finished product; and the fourth production station is configured to transfer a liquid polyurethane or liquid foam into the treated mold.

14. The system of claim 13, wherein the control system is further configured to:

before the finished product is removed from the mold, position at least some of a plurality of wheels of the first trolley in a guide rail;

before the mold is treated, move the first self-propelled trolley to the second production station and move the first trolley along the guide rail; and before the liquid polyurethane or liquid foam is transferred into the treated mold, move the first self-propelled trolley to the fourth production station and move the first trolley along the guide rail.

15. The system of claim 13, wherein the non-curing stations include a third production station which is configured to:

before the liquid polyurethane or liquid foam is transferred into the treated mold, insert an inlay or an auxiliary material into the treated mold.

16. The system of claim 13, wherein the first production station is configured to before the finished product is removed from the mold, connect the first trolley to utilities at the first production station;

the second production station is configured to before the mold is treated, connect the first trolley to utilities at the second production station; and the fourth production station is configured to before the liquid polyurethane or liquid foam is transferred into the treated mold, connect the first trolley to utilities at the fourth production station.

17. The system of claim 10, wherein the first curing station is configured to:

after the first self-propelled trolley is moved to the identified vacant curing station or after the first AMP is disengaged from the first trolley to disassemble the first self-propelled trolley, connect the first trolley to a heating unit.

18. The system of claim 10, wherein the curing stations are provided in a heating tunnel or enclosure, or a designated area on a production floor.

\* \* \* \* \*